(12) United States Patent
Akita

(10) Patent No.: US 9,793,565 B2
(45) Date of Patent: Oct. 17, 2017

(54) METHOD OF MANUFACTURING REINFORCED ELECTROLYTE MEMBRANE, METHOD OF MANUFACTURING MEMBRANE ELECTRODE ASSEMBLY, AND MEMBRANE ELECTRODE ASSEMBLY

(71) Applicant: TOYOTA JIDOSHA KABUSHIKI KAISHA, Toyota-shi, Aichi-ken (JP)

(72) Inventor: Yasuhiro Akita, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/908,172

(22) PCT Filed: Mar. 6, 2015

(86) PCT No.: PCT/JP2015/001242
§ 371 (c)(1),
(2) Date: Jan. 28, 2016

(87) PCT Pub. No.: WO2015/136905
PCT Pub. Date: Sep. 17, 2015

(65) Prior Publication Data
US 2016/0372773 A1    Dec. 22, 2016

(30) Foreign Application Priority Data

Mar. 14, 2014 (JP) .................... 2014-051214
Mar. 3, 2015 (JP) .................... 2015-040961

(51) Int. Cl.
*H01M 8/22* (2006.01)
*H01M 8/1086* (2016.01)
(Continued)

(52) U.S. Cl.
CPC .......... *H01M 8/1093* (2013.01); *B29C 65/02* (2013.01); *H01M 8/1004* (2013.01);
(Continued)

(58) Field of Classification Search
CPC ............ H01M 8/1093; H01M 8/1004; H01M 8/1053; B29C 65/02; B29K 2995/0005;
(Continued)

(56) References Cited

U.S. PATENT DOCUMENTS

2004/0195173 A1* 10/2004 Huang ............... B01D 39/1692
210/490
2006/0099476 A1    5/2006 Watakabe et al.
(Continued)

FOREIGN PATENT DOCUMENTS

CN    102959777 A    3/2013
JP    62-500759      3/1987
(Continued)

*Primary Examiner* — Cynthia K Walls
(74) *Attorney, Agent, or Firm* — Finnegan, Henderson, Farabow, Garrett & Dunner, LLP

(57) ABSTRACT

An object is to provide a technique that improves the power generation performance, while enhancing the strength of a reinforced electrolyte membrane. There is provided a method of manufacturing a reinforced electrolyte membrane that comprises a first reinforcing film on one surface of an electrolyte membrane and a second reinforcing film on the other surface of the electrolyte membrane. The method of manufacturing the reinforced electrolyte membrane comprises (a) process of thermally compressing the first reinforcing film and the second reinforcing film to the electrolyte membrane. In the process (a), a number of times of thermally compressing the second reinforcing film to the electrolyte membrane is less than a number of times of thermally compressing the first reinforcing film to the electrolyte membrane.

1 Claim, 10 Drawing Sheets

(51) Int. Cl.
  *H01M 8/1004* (2016.01)
  *H01M 8/1053* (2016.01)
  *B29C 65/02* (2006.01)
  *B29K 27/18* (2006.01)
  *B29L 31/34* (2006.01)
  *B29L 31/00* (2006.01)

(52) U.S. Cl.
  CPC ....... *H01M 8/1053* (2013.01); *B29K 2027/18* (2013.01); *B29K 2995/0005* (2013.01); *B29L 2031/3468* (2013.01); *B29L 2031/755* (2013.01); *Y02P 70/56* (2015.11)

(58) Field of Classification Search
  CPC ......... B29K 2027/18; B29L 2031/3468; B29L 2031/755; Y02P 70/56
  See application file for complete search history.

(56) References Cited

U.S. PATENT DOCUMENTS

| | | |
|---|---|---|
| 2008/0026277 A1 | 1/2008 | Peterson et al. |
| 2009/0174105 A1 | 7/2009 | Suzuki |
| 2012/0064430 A1 | 3/2012 | Nakanishi et al. |

FOREIGN PATENT DOCUMENTS

| | | |
|---|---|---|
| JP | 2007-145007 | 6/2007 |
| JP | 2008-4344 | 1/2008 |
| JP | 2008-277288 | 11/2008 |
| JP | 2011-146256 | 7/2011 |
| JP | 2011-190445 | 9/2011 |
| JP | 2012-109259 | 6/2012 |
| JP | 2014-229433 | 12/2014 |
| WO | WO 86/06879 A1 | 11/1986 |
| WO | WO 2014/188265 A1 | 11/2014 |

* cited by examiner

STEP S100

STEP S102

STEP S104

STEP S106

THERMAL COMPRESSION ↓

STEP S108

PEEL OFF ↓

STEP S110

STEP S112

STEP S200

STEP S202

|  | LOCATION OF MEASUREMENT | SURFACE ELASTIC MODULUS (MPa) |
|---|---|---|
| SAMPLE 1 (ROLL TEMPERATURE: 260°C) | SECOND REINFORCING FILM SIDE | 24 |
|  | FIRST REINFORCING FILM SIDE | 39 |
| SAMPLE 2 (ROLL TEMPERATURE: 230°C) | SECOND REINFORCING FILM SIDE | 22 |
|  | FIRST REINFORCING FILM SIDE | 25 |

Fig.12

|  | LOCATION OF MEASUREMENT | SURFACE ELASTIC MODULUS (MPa) |
|---|---|---|
| SAMPLE 1 | SECOND REINFORCING FILM SIDE | 28 |
|  | FIRST REINFORCING FILM SIDE | 49 |
| SAMPLE 2 | SECOND REINFORCING FILM SIDE | 26 |
|  | FIRST REINFORCING FILM SIDE | 28 |

METHOD OF MANUFACTURING REINFORCED ELECTROLYTE MEMBRANE, METHOD OF MANUFACTURING MEMBRANE ELECTRODE ASSEMBLY, AND MEMBRANE ELECTRODE ASSEMBLY

CROSS-REFERENCE TO RELATED APPLICATIONS

This application is a national phase application of International Application No. PCT/JP2015/001242, filed Mar. 6, 2015, and claims the priority of Japanese Application Nos. 2014-051214, filed Mar. 14, 2014 and 2015-040961, filed Mar. 3, 2015, the content of all of which is incorporated herein by reference.

TECHNICAL FIELD

The present invention relates to a reinforced electrolyte membrane and a membrane electrode assembly.

BACKGROUND ART

A known configuration of a reinforced electrolyte membrane includes reinforcing films provided on respective surfaces of an electrolyte. The reinforced electrolyte membrane may be manufactured by, for example, pressure bonding under application of heat (thermally compressing) a heated and molten electrolyte resin with porous reinforcing films supplied from the respective sides of the electrolyte resin (for example, JP 2008-004344A).

CITATION LIST

Patent Literature

[PTL 1] JP2008-004344A
[PTL 2] JP2008-277288A
[PTL 3] JP2011-146256A

SUMMARY OF INVENTION

Technical Problem

In general, in order to enhance the strength of the reinforced electrolyte membrane, it is preferable to increase the elastic modulus on the surface of the reinforced electrolyte membrane. In the process of manufacturing a membrane electrode assembly using the reinforced electrolyte membrane, however, there has been no specific consideration on the elastic modulus of a surface placed on the cathode side and the elastic modulus of a surface placed on the anode side. There is accordingly a need for a technique that improves the power generation performance while enhancing the strength of the reinforced electrolyte membrane. With regard to the prior art reinforced electrolyte membrane and the prior art membrane electrode assembly, other needs include simplification of the manufacturing process and reduction of cost.

Solution to Problem

In order to solve at least part of the above problems, the invention may be implemented by any of the following aspects.

(1) According to one aspect of the invention, there is provided a method of manufacturing a reinforced electrolyte membrane that comprises a first reinforcing film on one surface of an electrolyte membrane and a second reinforcing film on the other surface of the electrolyte membrane. The method of manufacturing the reinforced electrolyte membrane comprises (a) process of thermally compressing the first reinforcing film and the second reinforcing film to the electrolyte membrane. In the process (a), number of times of thermally compressing the second reinforcing film to the electrolyte membrane is less than number of times of thermally compressing the first reinforcing film to the electrolyte membrane. In the method of manufacturing the reinforced electrolyte membrane according to this aspect, the number of times of thermally compressing the first reinforcing film to the electrolyte membrane is set to two or more number of times. This enhances the strength of the reinforced electrolyte membrane, compared with single thermal compression. According to this aspect, the number of times of thermally compressing the second reinforcing film to the electrolyte membrane is less than the number of times of thermally compressing the first reinforcing film to the electrolyte membrane. The surface elastic modulus of the second reinforcing film side is thus lower than the surface elastic modulus of the first reinforcing film side. This enables a catalyst layer to be better bonded to the second reinforcing film side having the lower surface elastic modulus, compared with the first reinforcing film side. Especially a cathode catalyst layer often has a less content of an ionomer than an anode catalyst layer, in order to suppress flooding and improve the power generation performance. The less content of the ionomer leads to the higher elastic modulus of the catalyst layer, so that the cathode catalyst layer has the lower bondability to the electrolyte membrane than the anode catalyst layer. The configuration of this aspect, however, enables the cathode catalyst layer to be placed on the second reinforcing film side having the lower surface elastic modulus than the first reinforcing film side and thereby to be well bonded to the electrolyte membrane. This aspect accordingly manufactures the reinforced electrolyte membrane to which the cathode catalyst layer having significant contribution to the power generation performance is well bondable. This improves the power generation performance of a membrane electrode assembly that includes this reinforced electrolyte membrane.

(2) In the above aspect, the process (a) may comprise (a1) process of thermally compressing the first reinforcing film to one surface of the electrolyte membrane; and (a2) after the process (a1), process of placing the second reinforcing film on the other surface of the electrolyte membrane to which the first reinforcing film is thermally compressed and thermally compressing a stacked body including the first reinforcing film, the electrolyte membrane and the second reinforcing film. The method of manufacturing the reinforced electrolyte membrane of this aspect efficiently makes the number of times of thermal compression of the second reinforcing film less than the number of times of thermal compression of the first reinforcing film (3) According to another aspect of the invention, there is provided a method of manufacturing a membrane electrode assembly that comprises a reinforced electrolyte membrane manufactured by the method of manufacturing according to either the aspect (1) or the aspect (2) described above, an anode catalyst layer and a cathode catalyst layer. The method of manufacturing the membrane electrode assembly of this aspect comprises (b) process of forming the anode catalyst layer on a side of the reinforced electrolyte membrane to which the first reinforcing film is thermally compressed and forming the cathode catalyst layer on a side of the reinforced electrolyte membrane to which the second reinforcing film is thermally compressed. The method of manufacturing the membrane electrode assembly according to this aspect enables the cathode catalyst layer having significant contribution to the power generation performance to be well bonded to the reinforced electrolyte membrane, thus improving the power generation performance of the membrane electrode assembly.

(4) According to another aspect of the invention, there is provided a membrane electrode assembly. The membrane electrode assembly comprises a reinforced electrolyte membrane that comprises an electrolyte membrane, a first reinforcing film placed on one surface of the electrolyte membrane and a second reinforcing film placed on the other surface of the electrolyte membrane; an anode catalyst layer that is placed on a surface of a side of the reinforced electrolyte membrane on which the first reinforcing film is placed; and a cathode catalyst layer that is placed on a surface of a side of the reinforced electrolyte membrane on which the second reinforcing film is placed. The second reinforcing film has a lower surface elastic modulus than a surface elastic modulus of the first reinforcing film. In the membrane electrode assembly of this aspect, the surface elastic modulus of the second reinforcing film placed on the cathode side is lower than the surface elastic modulus of the first reinforcing film placed on the anode side. This enhances the adhesiveness of the reinforced electrolyte membrane with the cathode catalyst layer having the higher contribution to the power generation performance. This results in improving the power generation performance of the membrane electrode assembly. The surface elastic modulus of the anode-side reinforcing film is higher than the surface electric modulus of the cathode-side reinforcing film. This configuration ensures the sufficient strength of the membrane electrode assembly as a whole, while improving the power generation performance of the membrane electrode assembly.

The invention may be implemented by various aspects other than the aspects of the method of manufacturing the reinforced electrolyte membrane, the method of manufacturing the membrane electrode assembly and the membrane electrode assembly described above. For example, the invention may be implemented by aspects such as a fuel cell including the reinforced electrolyte membrane or the membrane electrode assembly and an apparatus for manufacturing the reinforced electrolyte membrane or the membrane electrode assembly.

BRIEF DESCRIPTION OF DRAWINGS

FIG. 12 is a table showing the results of measurement of surface elastic modulus after evaluation of power generation performance.

DESCRIPTION OF EMBODIMENTS

A. First Embodiment

A1. Configuration of Membrane Electrode Assembly

Figure 1:
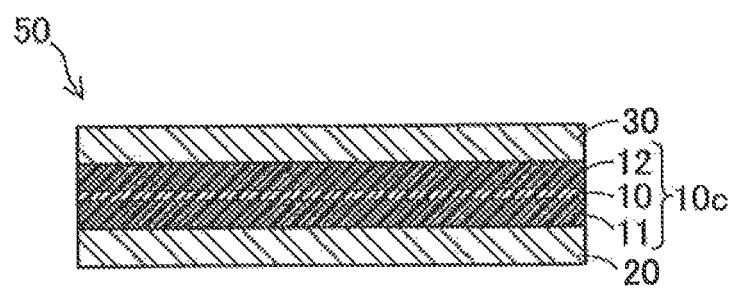
FIG. 1 is a diagram illustrating a membrane electrode assembly according to one embodiment of the invention.

FIG. 1 is a diagram illustrating a membrane electrode assembly (MEA) 50 according to one embodiment of the invention. The MEA 50 includes a reinforced electrolyte membrane 10c, an anode catalyst layer 20 and a cathode catalyst layer 30. The reinforced electrolyte membrane 10c is a membrane formed by integrating an electrolyte membrane 10, a first reinforcing film 11 placed on one surface of the electrolyte membrane 10 and a second reinforcing film 12 placed on the other surface of the electrolyte membrane 10. The first reinforcing film 11 and the second reinforcing film 12 are porous films having pores. The pores of the first reinforcing film 11 and the second reinforcing film 12 are filled with part of the electrolyte of the electrolyte membrane 10. According to this embodiment, the reinforced electrolyte membrane 10c is formed such that a second reinforcing film 12-side surface has a lower elastic modulus than the elastic modulus of a first reinforcing film 11-side surface.

The anode catalyst layer 20 is formed on the first reinforcing film 11-side of the reinforced electrolyte membrane 10c. The cathode catalyst layer 30 is formed on the second reinforcing film 12-side of the reinforced electrolyte membrane 10c. Each of the anode catalyst layer 20 and the cathode catalyst layer 30 includes a catalyst that accelerates the chemical reaction of hydrogen and oxygen, carbon particles that have the catalyst supported thereon, and an ionomer that is identical with or analogous to the constituent of the electrolyte membrane 10. According to this embodiment, in order to suppress flooding, the cathode catalyst layer 30 is configured as a catalyst layer having a less content of the ionomer than that of the anode catalyst layer 20. In general, the less content of the ionomer leads to the higher elastic modulus of the resulting catalyst layer. According to this embodiment, the cathode catalyst layer 30 is thus configured to have a higher elastic modulus than the elastic modulus of the anode catalyst layer 20.

A2. Method of Manufacturing Reinforced Electrolyte Membrane

Figure 2:
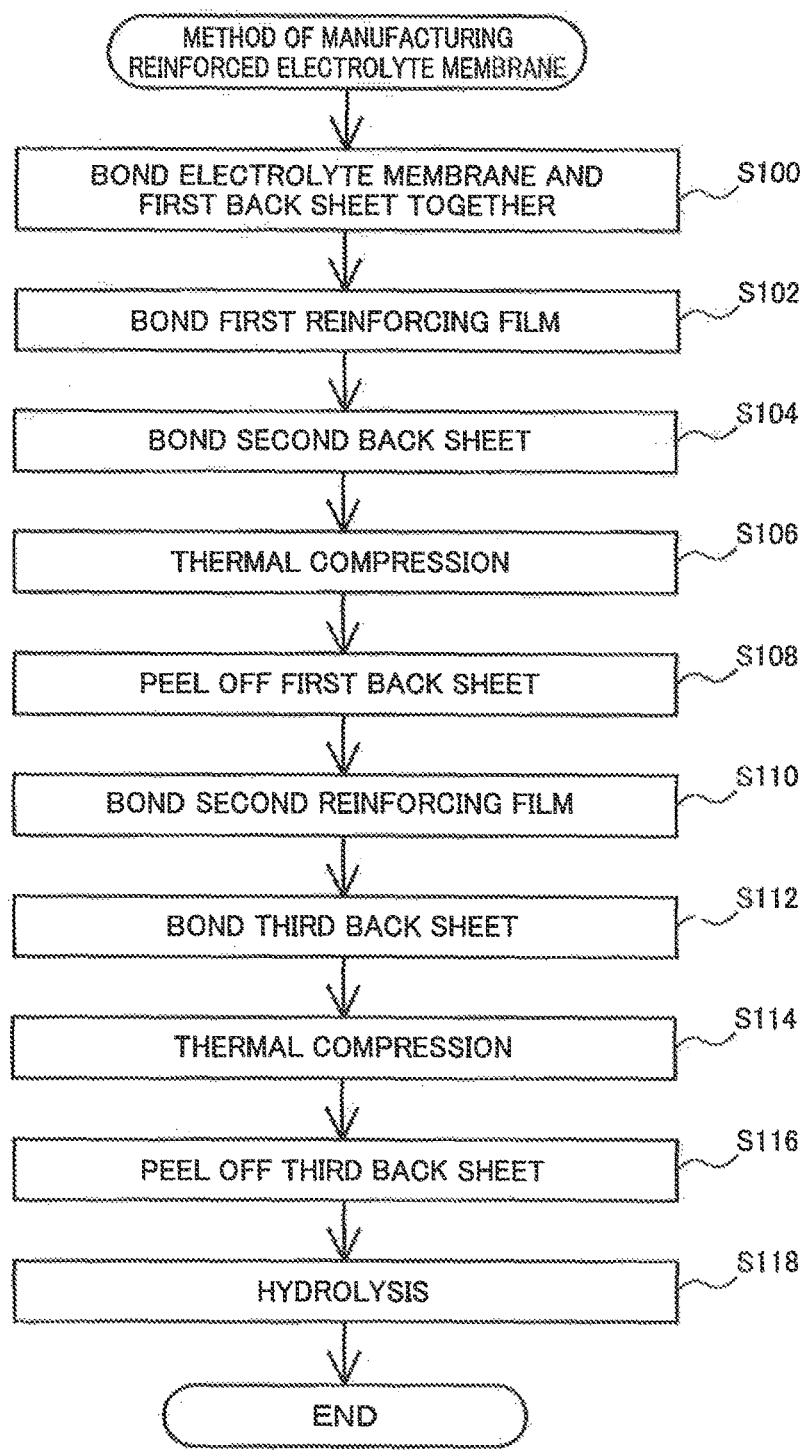
FIG. 2 is a flowchart showing a method of manufacturing a reinforced electrolyte membrane.
Figure 3:
FIG. 3 is a diagram schematically illustrating the processes of steps S100 to S104 in FIG. 2.
Figure 3:
Figure 3:
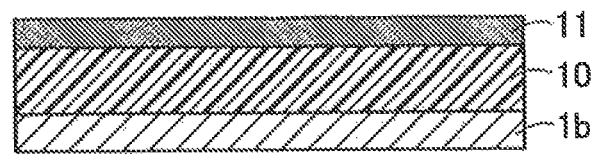
Figure 3:
Figure 3:
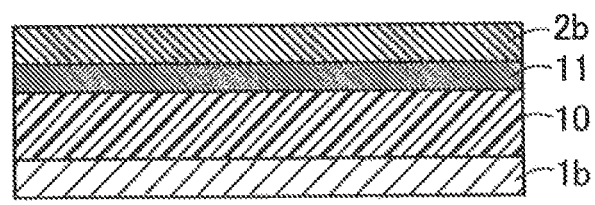
Figure 4:
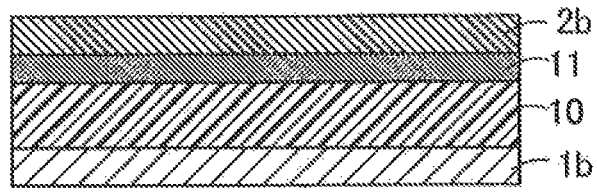
FIG. 4 is a diagram schematically illustrating the processes of steps S106 to S108 in FIG. 2.
Figure 4:
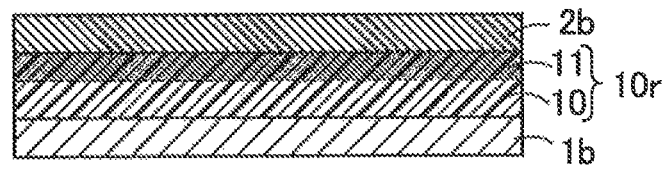
Figure 4:
Figure 4:
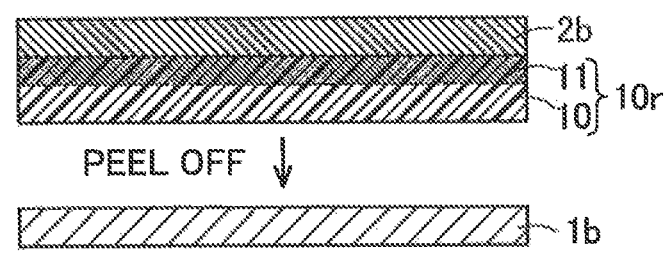
Figure 5:
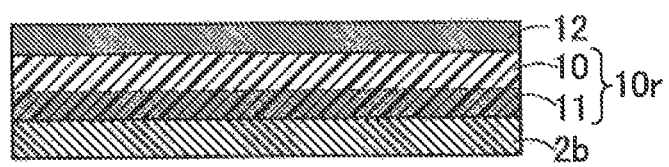
FIG. 5 is a diagram schematically illustrating the processes of steps S110 to S112 in FIG. 2.
Figure 5:
Figure 5:
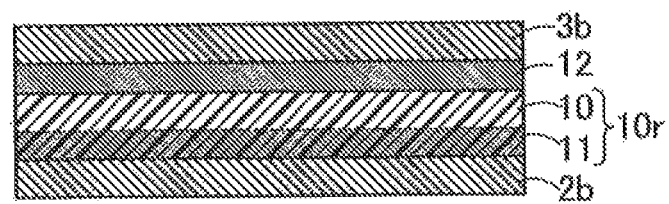
Figure 6:
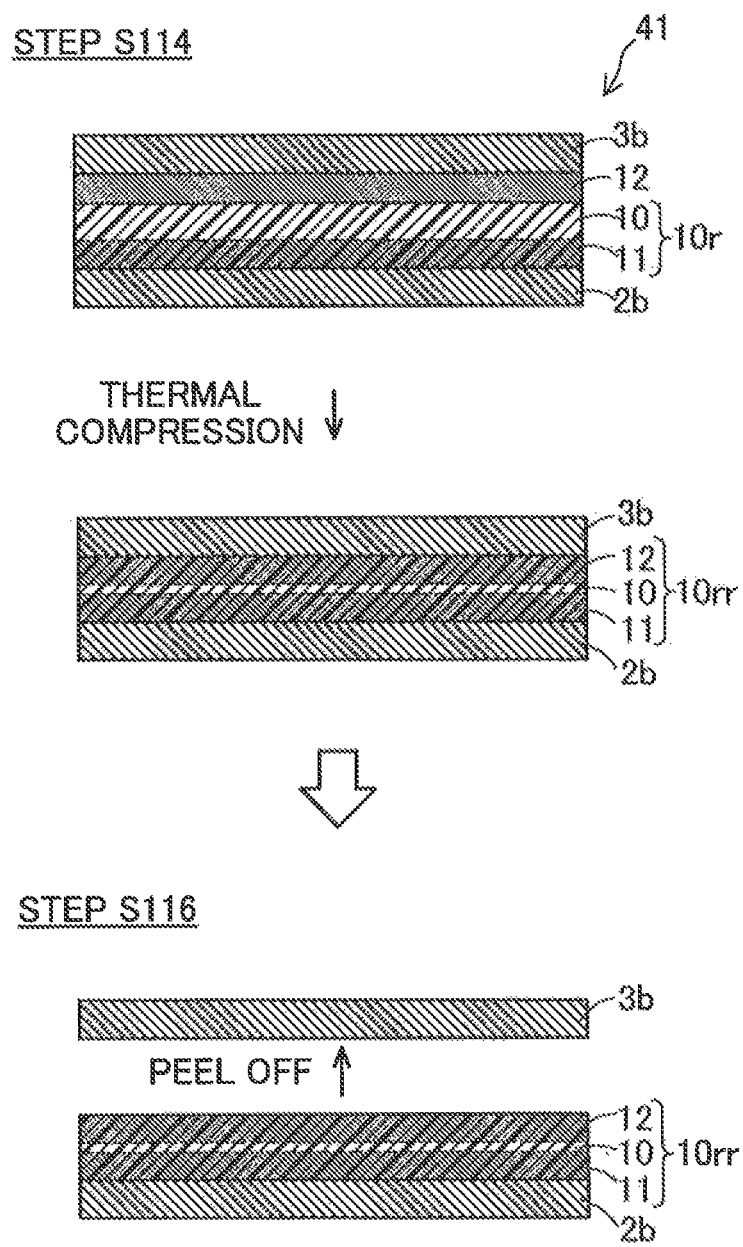
FIG. 6 is a diagram schematically illustrating the processes of steps S114 to S116 in FIG. 2.

FIG. 2 is a flowchart showing a method of manufacturing the reinforced electrolyte membrane 10c. FIG. 3 is a diagram schematically illustrating the processes of steps S100 to S104. FIG. 4 is a diagram schematically illustrating the processes of steps S106 to S108. FIG. 5 is a diagram schematically illustrating the processes of steps S110 to S112. FIG. 6 is a diagram schematically illustrating the processes of steps S114 to S116. The following describes the method of manufacturing the reinforced electrolyte membrane 10c with reference to FIGS. 2 to 6.

The procedure of manufacturing the reinforced electrolyte membrane 10c first bonds the electrolyte membrane 10 and a first back sheet 1b together (step S100 in FIGS. 2 and 3). According to this embodiment, the first back sheet 1b is a polytetrafluoroethylene (PTFE) film of approximately 50 µm in thickness. The electrolyte membrane 10 is a synthetic resin having —SO₂F as a side-chain end group. The electrolyte membrane 10 has the thickness of approximately 10 µm. At step S100, the synthetic resin having —SO₂F as the side-chain end group is extruded onto the first back sheet 1b by a molding machine, so that the electrolyte membrane 10 and the first back sheet 1b are bonded together.

The procedure subsequently bonds the first reinforcing film 11 on the electrolyte membrane 10 bonded with the first back sheet 1b (step S102 in FIGS. 2 and 3). The first reinforcing film 11 is a film made porous by stretching polytetrafluoroethylene (PTFE) which is a fluorine-based synthetic resin.

After bonding the first reinforcing film 11 on the electrolyte membrane 10, the procedure bonds a second back sheet 2b on the first reinforcing film 11 (step S104 in FIGS. 2 and 3). The second back sheet 2b is a perfluoroalkoxy fluororesin (PFA) film of approximately 50 µm in thickness.

The procedure subsequently applies heat and pressure from the respective surfaces of the first back sheet 1b and the second back sheet 2b, so as to thermally compress the electrolyte membrane 10 with the first reinforcing film 11 (step S106 in FIGS. 2 and 4). The process of thermal compression uses a roll heated to a temperature of 260° C. and applies a pressure of 1.2 ton from the respective surfaces of the first back sheet 1b and the second back sheet 2b to a stacked body 40 in which the first back sheet 1b, the electrolyte membrane 10, the first reinforcing film 11 and the second back sheet 2b are sequentially stacked. The conveying speed of the stacked body 40 is 0.5 m/min. The contact time of the roll with the stacked body 40 is approximately 3 minutes. The process of thermal compression forms a molten impregnated membrane 10r in which the first reinforcing film 11 is impregnated with part of the electrolyte of the electrolyte membrane 10.

The procedure subsequently peels off the first back sheet 1b bonded to the electrolyte membrane 10-side of the molten impregnated membrane 10r, from the molten impregnated membrane 10r (step S108 in FIGS. 2 and 4). The first back sheet 1b has the lower adhesive force than the second back sheet 2b, so that the first back sheet 1b is readily peeled off from the molten impregnated membrane 10r.

The procedure subsequently bonds the second reinforcing film 12 on the side of the molten impregnated membrane 10r from which the first back sheet 1b is peeled off, i.e., on the electrolyte membrane 10 (step S110 in FIGS. 2 and 5). The second reinforcing film 12 is a film made porous by stretching PTFE. The procedure then bonds a third back sheet 3b on the second reinforcing film 12 (step S112 in FIGS. 2 and 5). According to this embodiment, the third back sheet 3b is a PFA film of approximately 50 µm in thickness, like the second back sheet 2b.

After bonding the third back sheet 3b, the procedure thermally compresses the electrolyte membrane 10 with the first reinforcing film 11 and the electrolyte membrane 10 with the second reinforcing film 12 from the respective surfaces of the second back sheet 2b and the third back sheet 3b (step S114 in FIGS. 2 and 6). The process of thermal compression uses a roll heated to a temperature of 260° C. and applies a pressure of 1.2 ton from the respective surfaces of the second back sheet 2b and the third back sheet 3b to a stacked body 41 in which the second back sheet 2b, the molten impregnated membrane 10r, the second reinforcing film 12 and the third back sheet 3b are sequentially stacked. The conveying speed of the stacked body 41 is 0.5 m/min. The contact time of the roll with the stacked body 41 is approximately 3 minutes. The process of thermal compression causes the second reinforcing film 12 to be impregnated with part of the electrolyte of the electrolyte membrane 10. This process also causes the first reinforcing film 11 to be impregnated with part of the electrolyte of the electrolyte membrane 10. This forms a reinforced electrolyte membrane 10rr.

The procedure subsequently peels off the third back sheet 3b bonded to the second reinforcing film 12-side of the reinforced electrolyte membrane 10rr, from the reinforced electrolyte membrane 10rr (step S116 in FIGS. 2 and 6). The third back sheet 3b is thermally compressed to the second reinforcing film 12 only once (step S108). The second back sheet 2b is, on the other hand, thermally compressed to the first reinforcing film 11 twice (steps S106 and S108). According to this embodiment, the third back sheet 3b and the second back sheet 2b are formed from the same PFA films. The less number of times of thermal compression, however, causes the third back sheet 3b to be more weakly bonded to the stacked body 41, compared with the second back sheet 2b. The third back sheet 3b is thus readily peeled off from the reinforced electrolyte membrane 10rr.

Figure 7:
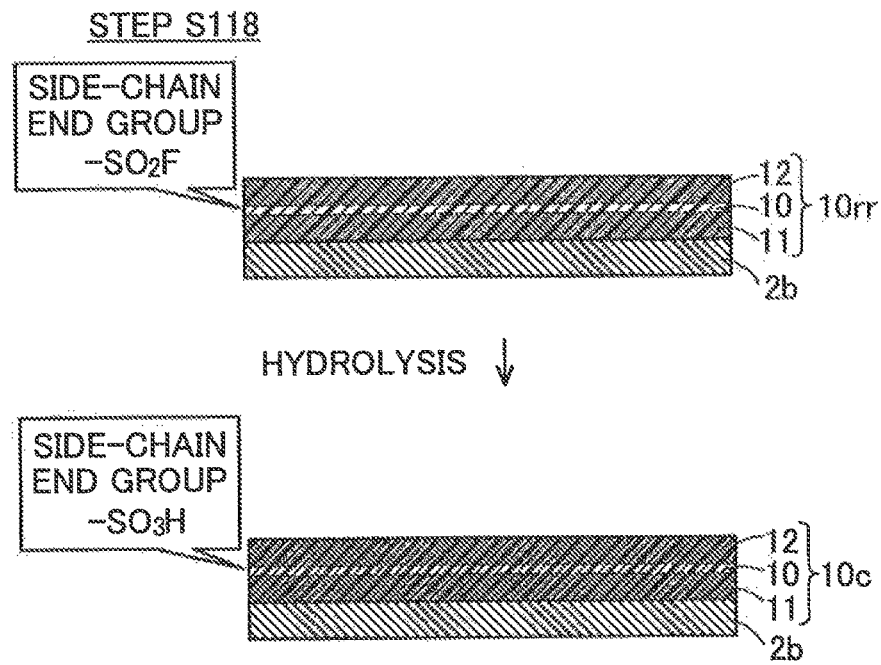
FIG. 7 is a diagram schematically illustrating the process of step S118 in FIG. 2.

After peeling off the third back sheet 3b, the procedure makes the reinforced electrolyte membrane 10rr subject to hydrolysis (step S118 in FIGS. 2 and 7). The process of hydrolysis provides the reinforced electrolyte membrane 10rr with the proton conductivity, so as to manufacture the reinforced electrolyte membrane 10c having —SO₃H as the side-chain end group. According to this embodiment, the thickness of the final reinforced electrolyte membrane 10c is approximately 8 µm. The manufacturing method described above efficiently makes the number of times of thermal compression of the second reinforcing film 12 less than the number of times of thermal compression of the first reinforcing film 11.

A3. Method of Manufacturing Membrane Electrode Assembly

Figure 8:
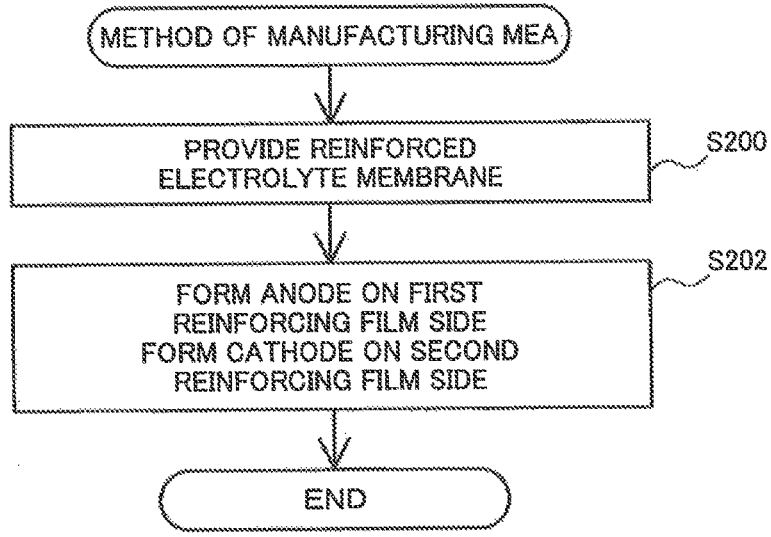
FIG. 8 is a flowchart showing a method of manufacturing a membrane electrode assembly.
Figure 9:
FIG. 9 is a diagram schematically illustrating the method of manufacturing the membrane electrode assembly of FIG. 8.
Figure 9:
Figure 9:
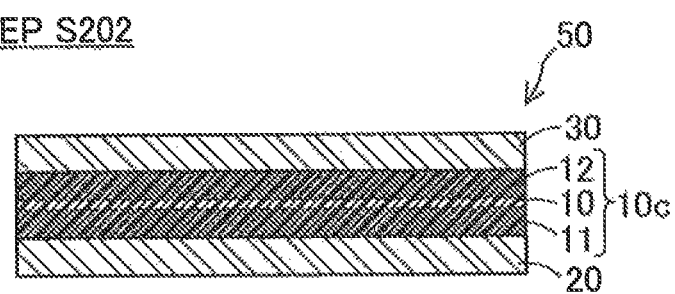

FIG. 8 is a flowchart showing a method of manufacturing the MEA 50. FIG. 9 is a diagram schematically illustrating the method of manufacturing the MEA 50. The procedure of manufacturing the MEA 50 first provides the reinforced electrolyte membrane 10c manufactured by the method of manufacturing the reinforced electrolyte membrane (FIG. 2) described above (step S200 in FIGS. 8 and 9).

The procedure subsequently forms the anode catalyst layer 20 on the side of the reinforced electrolyte membrane 10c which the first reinforcing film 11 is thermally compressed to, and forms the cathode catalyst layer 30 on the side of the reinforced electrolyte membrane 10c which the second reinforcing film 12 is thermally compressed to (step S202 in FIGS. 8 and 9). In other words, the process of step S202 forms the anode catalyst layer 20 on the surface of the reinforced electrolyte membrane 10c subjected to the more frequent thermal compression, while forming the cathode catalyst layer 30 on the surface of the reinforced electrolyte membrane 10c subjected to the less frequent thermal compression. The anode catalyst layer 20 and the cathode catalyst layer 30 are formed by hot pressing. The temperature of hot pressing is 160° C. This manufactures the MEA 50. According to this embodiment, hot pressing at the temperature of 160° C. does not reduce the membrane thickness of the reinforced electrolyte membrane 10c or does not cause deformation on the surface of the reinforced electrolyte membrane 10c.

In the method of manufacturing the reinforced electrolyte membrane 10c and the method of manufacturing the MEA 50 according to the embodiment described above, the number of times of thermal compression of the second reinforcing film 12 to the electrolyte membrane 10 is less than the number of times of thermal compression of the first reinforcing film 11 to the electrolyte membrane 10. This causes the surface elastic modulus on the second reinforcing film 12-side to be lower than the surface elastic modulus on the first reinforcing film 11-side. This enables a catalyst layer to be better bonded to the second reinforcing film 12-side having the lower surface elastic modulus, compared with the first reinforcing film 11-side. Especially this embodiment employs a catalyst layer that has a less content of the ionomer than that of the anode catalyst layer, for the cathode catalyst layer 30, in order to suppress flooding and improve the power generation performance. The less content of the ionomer leads to the higher elastic modulus of the catalyst layer, so that the cathode catalyst layer 30 has the lower bondability to the electrolyte membrane 10 than the anode catalyst layer 20. According to this embodiment, the cathode catalyst layer 30 is placed on the second reinforcing film 12-side having the lower surface elastic modulus. This configuration enables the cathode catalyst layer 30 to be better bonded to the electrolyte membrane 10, compared with a configuration that the cathode catalyst layer 30 is placed on the first reinforcing film 11-side. In other words, the procedure of this embodiment manufactures the reinforced electrolyte membrane 10c to which the cathode catalyst layer 30 having significant contribution to the power generation performance is well bondable, thus improving the power generation performance of the MEA 50. The surface elastic modulus of the anode-side reinforcing film (first reinforcing film 11) is higher than the surface elastic modulus of the cathode-side reinforcing film (second reinforcing film 12). This configuration ensures the sufficient strength of the MEA 50 as a whole, while improving the power generation performance of the MEA 50.

Additionally, according to this embodiment, the first reinforcing film 11 of the reinforced electrolyte membrane 10c is thermally compressed to the electrolyte membrane 10 twice. This enhances the strength of the reinforced electrolyte membrane 10c, compared with a method of manufacturing a reinforced electrolyte membrane by single thermal compression. The process of thermal compression employs a relatively high temperature of 260° C. This causes the first reinforcing film 11 and the second reinforcing film 12 to be impregnated with the electrolyte of the electrolyte membrane 10 more homogeneously in a shorter time period, compared with a process of thermal compression employing a lower temperature. The method of manufacturing the reinforced electrolyte membrane 10c according to the embodiment thus shortens the time period required for manufacturing the reinforced electrolyte membrane 10c.

A4. Results of Experiments

The following describes the grounds on which the reinforced electrolyte membrane 10c and the MEA 50 are manufactured by the manufacturing methods described above, with reference to experimental examples.

A4-1. Measurement of Surface Elastic Modulus

Figures 10, 11:
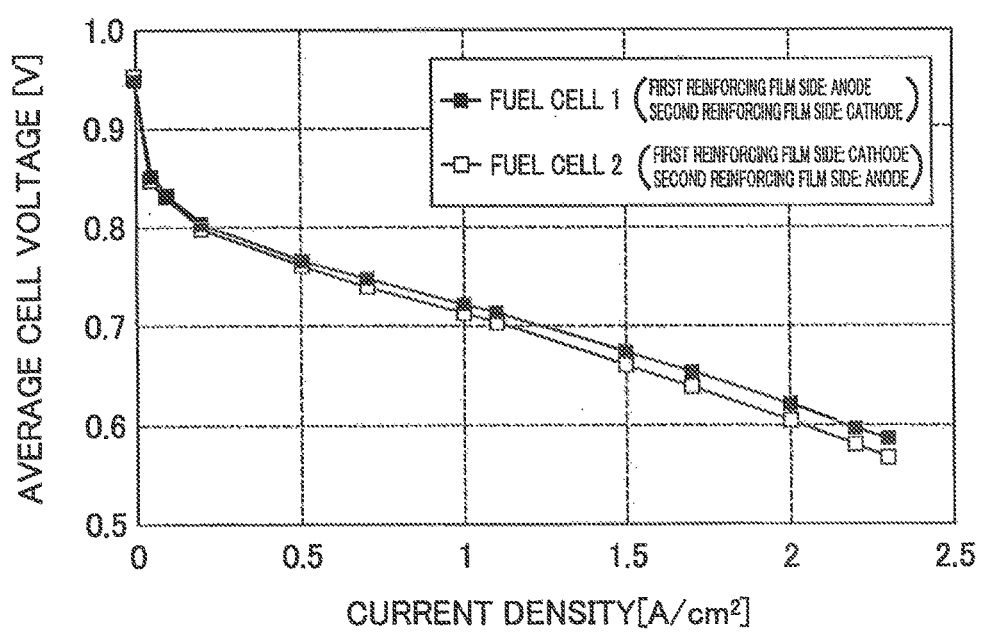
FIG. 10 is a table showing the results of measurement of surface elastic modulus.
FIG. 11 is a graph showing relationship between the current density and the average cell voltage.

FIG. 10 is a table showing the results of measurement of the surface elastic modulus of the reinforced electrolyte membrane 10c. FIG. 10 shows the results of measurement of the surface elastic modulus of the first reinforcing film 11-side and the second reinforcing film 12-side with regard to the reinforced electrolyte membrane 10c manufactured by the manufacturing method described above (hereinafter referred to as sample 1) and a reinforced electrolyte membrane manufactured by changing the temperature of the roll to 230° C. in the process of thermal compression (steps S106 and S114) in the above manufacturing method (hereinafter referred to as sample 2). The measurement of surface elastic modulus used Nano Indenter G200 (manufactured by Agilent Technologies Inc.) to measure the elastic modulus at the depth of approximately 800 nm from the surface with regard to the sample 1 and the sample 2. The measurement temperature was 120° C.

As shown in FIG. 10, with regard to the sample 1, the surface elastic modulus of the second reinforcing film 12-side was 24 MPa, and the surface elastic modulus of the first reinforcing film 11-side was 39 MPa. With regard to the sample 1, the first reinforcing film 11-side had the higher surface elastic modulus than the second reinforcing film 12-side. The difference between the surface elastic modulus of the first reinforcing film 11-side and the surface elastic modulus of the second reinforcing film 12-side was 15 MPa. The number of times of thermal compression was twice on the first reinforcing film 11-side (steps S106 and S114 in FIG. 2), while being only once on the second reinforcing film 12-side (step S114 in FIG. 2). The first reinforcing film 11 was thus subjected to more frequent thermal compression to the electrolyte membrane 10, compared with the second reinforcing film 12. This causes the first reinforcing film 11 to be impregnated with a larger amount of the electrolyte of the electrolyte membrane 10, compared with the second reinforcing film 12. This appears to make the surface elastic modulus of the first reinforcing film 11-side higher than the surface elastic modulus of the second reinforcing film 12-side.

With regard to the sample 2 manufactured at the temperature of the roll set to 230° C. in the process of thermal compression, the surface elastic modulus of the second reinforcing film 12-side was 22 MPa, and the surface elastic modulus of the first reinforcing film 11-side was 25 MPa. With regard to the sample 2, the first reinforcing film 11-side had the slightly higher surface elastic modulus than the second reinforcing film 12-side. The difference between the surface elastic modulus of the first reinforcing film 11-side and the surface elastic modulus of the second reinforcing film 12-side was 3 MPa.

These results show that the first reinforcing film 11 subjected to the more frequent thermal compression to the electrolyte membrane 10 has the higher surface elastic modulus, out of the reinforcing films of the reinforced electrolyte membrane 10c. These results also show that the higher temperature of the roll leads to the higher surface elastic modulus. Additionally, these results show that the higher temperature of the roll leads to the greater difference between the surface elastic modulus of the first reinforcing film 11-side and the surface elastic modulus of the second reinforcing film 12-side.

A4-2. Evaluation of Power Generation Performance

FIG. 11 is a graph showing relationship between the current density and the average cell voltage. FIG. 11 shows the results of evaluation of power generation performance with regard to a fuel cell including the MEA 50 in which the anode catalyst layer 20 is formed on the first reinforcing film 11-side of the reinforced electrolyte membrane 10c manufactured by the above manufacturing method and the cathode catalyst layer 30 is formed on the second reinforcing film 12-side (hereinafter referred to as fuel cell 1) and a fuel cell including an MEA in which the cathode catalyst layer 30 is formed on the first reinforcing film 11-side of the reinforced electrolyte membrane 10c and the anode catalyst layer 20 is formed on the second reinforcing film 12-side (hereinafter referred to as fuel cell 2).

As shown in FIG. 11, at an identical cell voltage, the current density of the fuel cell 1 is higher than the current density of the fuel cell 2. For example, at an average cell voltage of 0.6 V, the current density of the fuel cell 1 was about 2.25 (A/cm$^2$), while the current density of the fuel cell 2 was about 2.05 (A/cm$^2$). These results of evaluation show that the fuel cell 1 including the MEA 50 manufactured by the method of this embodiment, i.e., the MEA 50 in which the cathode catalyst layer 30 is formed on the second reinforcing film 12-side having the lower surface elastic modulus, has the better power generation performance than the fuel cell 2 including the MEA in which the anode catalyst layer 20 is formed on the second reinforcing film 12-side.

A4-3. Measurement of Surface Elastic Modulus after Evaluation of Power Generation Performance FIG. 12 is a table showing the results of measurement of the surface elastic modulus after evaluation of the power generation performance. This measurement experiment manufactured MEAs respectively using the reinforced electrolyte membrane of the sample 1 and the reinforced electrolyte membrane of the sample 2 and provided fuel cells including such MEAs. These fuel cells were evaluated by the above evaluation of power generation performance. The MEAs were then taken out of the respective fuel cells, and only the reinforced electrolyte membrane was left by peeling off the cathode catalyst layer and the anode catalyst layer from each of the MEAs. The surface elastic modulus was then measured on the first reinforcing film 11-side and the second reinforcing film 12-side. FIG. 12 shows the results of measurement. The surface elastic modulus was measured by the same measurement method as that described above.

As shown in FIG. 12, after evaluation of the power generation performance, with regard to both the sample 1 and the sample 2, the values of the surface elastic modulus of the first reinforcing film 11-side and the second reinforcing film 12-side of the reinforced electrolyte membrane 10c are increased from the values shown in FIG. 10. These results may be attributed to that the surface elastic modulus is increased by the heat history at the time of manufacturing the MEA and at the time of evaluation of the power generation performance. According to these results of measurement, with regard to the reinforced electrolyte membrane 10c of the sample 1, the surface elastic modulus of the first reinforcing film 11-side is higher than the surface elastic modulus of the second reinforcing film 12-side by at least 15 MPa even after evaluation of the power generation. These results of measurement further prove that the configuration of placing the cathode catalyst layer 30 having significant contribution to power generation on the second reinforcing film 12-side having the lower surface elastic modulus and placing the anode catalyst layer 20 on the first reinforcing film 11-side having the higher surface elastic modulus is advantageous for the strength of the MEA 50.

B. Modifications

B1. First Modification

The procedure of the above embodiment thermally compresses the first reinforcing film 11 to the electrolyte membrane 10 twice, while thermally compressing the second reinforcing film 12 to the electrolyte membrane 10 only once. The number of times of thermal compression of the first reinforcing film 11 to the electrolyte membrane 10 may be three or more number of times. The number of times of thermal compression of the second reinforcing film 12 may be two or more number of times as long as the number of times of thermal compression of the second reinforcing film 12 is less than the number of times of thermal compression of the first reinforcing film 11.

B2. Second Modification

The procedure of the above embodiment bonds the reinforcing films 11 and 12 on the electrolyte membrane 10 (steps S102 and S110 in FIG. 10) and additionally bonds the back sheets 2b and 3b on the reinforcing films 11 and 12 (steps S104 and S112 in FIG. 2). A modified procedure may bond reinforcing films 11 and 12 that are respectively bonded in advance with back sheets 2b and 3b, on the electrolyte membrane 10.

B3. Third Modification

In the embodiment described above, the first reinforcing film 11 and the second reinforcing film 12 are made of PTFE. The first reinforcing film 11 and the second reinforcing film 12 may be made of another porous polymer resin, such as PE (polyethylene), PP (polypropylene) or polyimide.

REFERENCE SIGNS LIST 1b first back sheet
2b second back sheet
3b third back sheet
10 electrolyte membrane
10c, 10rr reinforced electrolyte membrane
10r molten impregnated membrane
11 first reinforcing film
12 second reinforcing film
20 anode catalyst layer
30 cathode catalyst layer
40, 41 stacked body
50 MEA

The invention claimed is:

1. A membrane electrode assembly, comprising:
a reinforced electrolyte membrane that comprises an electrolyte membrane, a first reinforcing film placed on one surface of the electrolyte membrane and a second reinforcing film placed on the other surface of the electrolyte membrane;
an anode catalyst layer that is placed on a surface of a side of the reinforced electrolyte membrane on which the first reinforcing film is placed; and
a cathode catalyst layer that is placed on a surface of a side of the reinforced electrolyte membrane on which the second reinforcing film is placed, wherein
the second reinforcing film has a lower surface elastic modulus than a surface elastic modulus of the first reinforcing film.

* * * * *